(12) United States Patent
Berfield

(10) Patent No.: US 6,385,853 B1
(45) Date of Patent: May 14, 2002

(54) ROTARY FLAIL FEEDING DEVICE

(76) Inventor: Robert C. Berfield, 3681 Nichols Run Rd., Jersey Shore, PA (US) 17740-8600

( * ) Notice: Subject to any disclaimer, the term of this patent is extended or adjusted under 35 U.S.C. 154(b) by 0 days.

(21) Appl. No.: 09/603,697

(22) Filed: Jun. 26, 2000

(51) Int. Cl.⁷ ............................................... A01D 34/90
(52) U.S. Cl. .......................................... 30/276; 30/347
(58) Field of Search ..................... 30/347, 276; 56/12.7

(56) References Cited

U.S. PATENT DOCUMENTS

| | | | |
|---|---|---|---|
| 3,708,967 A | 1/1973 | Geist et al. | 56/12.7 |
| 4,035,912 A | 7/1977 | Ballas et al. | 30/276 |
| 4,118,864 A | 10/1978 | Pittinger, Sr. et al. | 30/276 |
| 4,138,810 A | 2/1979 | Pittinger, Sr. et al. | 30/276 |
| 4,209,902 A | 7/1980 | Moore et al. | 30/276 |
| 4,244,103 A | 1/1981 | Snarr | 30/276 |
| 4,476,632 A | 10/1984 | Prouix | 30/276 |
| 4,607,431 A | 8/1986 | Gay | 30/276 |
| 4,817,288 A | 4/1989 | Hirose et al. | 30/276 |
| 5,095,688 A | 3/1992 | Fabrizio | 56/12.7 |
| 5,339,526 A | 8/1994 | Everts | 30/276 |
| 5,675,897 A | 10/1997 | Berfield | 30/276 |
| 5,743,019 A | 4/1998 | Berfield | 30/276 |
| 6,272,756 B1 * | 8/2001 | Peterson et al. | 30/276 X |

* cited by examiner

*Primary Examiner*—Douglas D. Watts
(74) *Attorney, Agent, or Firm*—Thomas Hooker, P.C.

(57) ABSTRACT

A rotary device useful for trimming vegetation which automatically feeds two flail lines to establish and maintain two rotary flails.

21 Claims, 4 Drawing Sheets

ROTARY FLAIL FEEDING DEVICE

FIELD OF THE INVENTION

The invention relates to a rotary flail feeding device commonly used to trim grass, weeds and light brush.

DESCRIPTION OF THE PRIOR ART

My U.S. Pat. Nos. 5,675,897 and 5,743,019 disclose rotary flail feeding devices for trimming grass, weeds, small shrubs and the like. In these devices lengths of coiled flail line are stored in single cavities and are fed radially inwardly, around a central post and then outwardly from the flail feeding device to form rotary flails. The devices are rotated by a conventional electric motor or gasoline engine so that the flails are held outwardly by centrifugal force for cutting. During operation, the ends of the flails are worn or break away and are replaced by additional flail line automatically unwound from the central post, without operator intervention.

The fail feeding devices disclosed in my patents can be used with two lengths of spiral wound coil line in the storage cavity and two outwardly extending flails. When two flails are used, a line director or guide mounted on the post maintains the two flails 180 degrees spaced from each other around the post to facilitate balance of the head and limit tangling of the flails.

During operation of the two flail devices, two lengths of flail line in the storage cavity are fed to the post through a single annular line feed passage. The passage has a width less than twice the diameter of the flail line. The two lengths of flail line can jam in the feed passage. The device must be disassembled to clear the jam. Jamming may occur because the individual lengths of flail line are fed along the passage at different rates.

Thus, there is a need for an improved two flail rotary flail feeding device or head where flail line for each flail is reliably fed to the post to reestablish length of shortened flails. The head should operate automatically without operator intervention or jams.

SUMMARY OF THE INVENTION

The invention is a rotary flail feeding device with two flails which automatically feeds flail line to the flails to replenish length of the flails as worn, without jams. The flail feeding device or head includes a separate line storage cavity and feed passage for each length of flail line. Each feeding passage extends from a storage cavity to the post and assures that flail line is fed to the post to replenish both flails as needed, without jamming.

In the disclosed invention, the two flails extend outwardly from the center of the head. Separated line storage cavities and feeding passages are located on the top and bottom of the head and feed lengths of flail line to the top and bottom of a central post. The flail lines are automatically wound around the top and bottom of the post, fed toward the center of the post and extend outwardly from the center of the post to form flails. A line guide mounted on the center of the post facilitates feeding the line to the flails.

Other objects and features of the invention will become apparent as the description proceeds, especially when taken in conjunction with the accompanying drawings illustrating the invention, of which there are four sheets of drawings and two embodiments.

DESCRIPTION OF THE PREFERRED EMBODIMENTS

Figure 1:
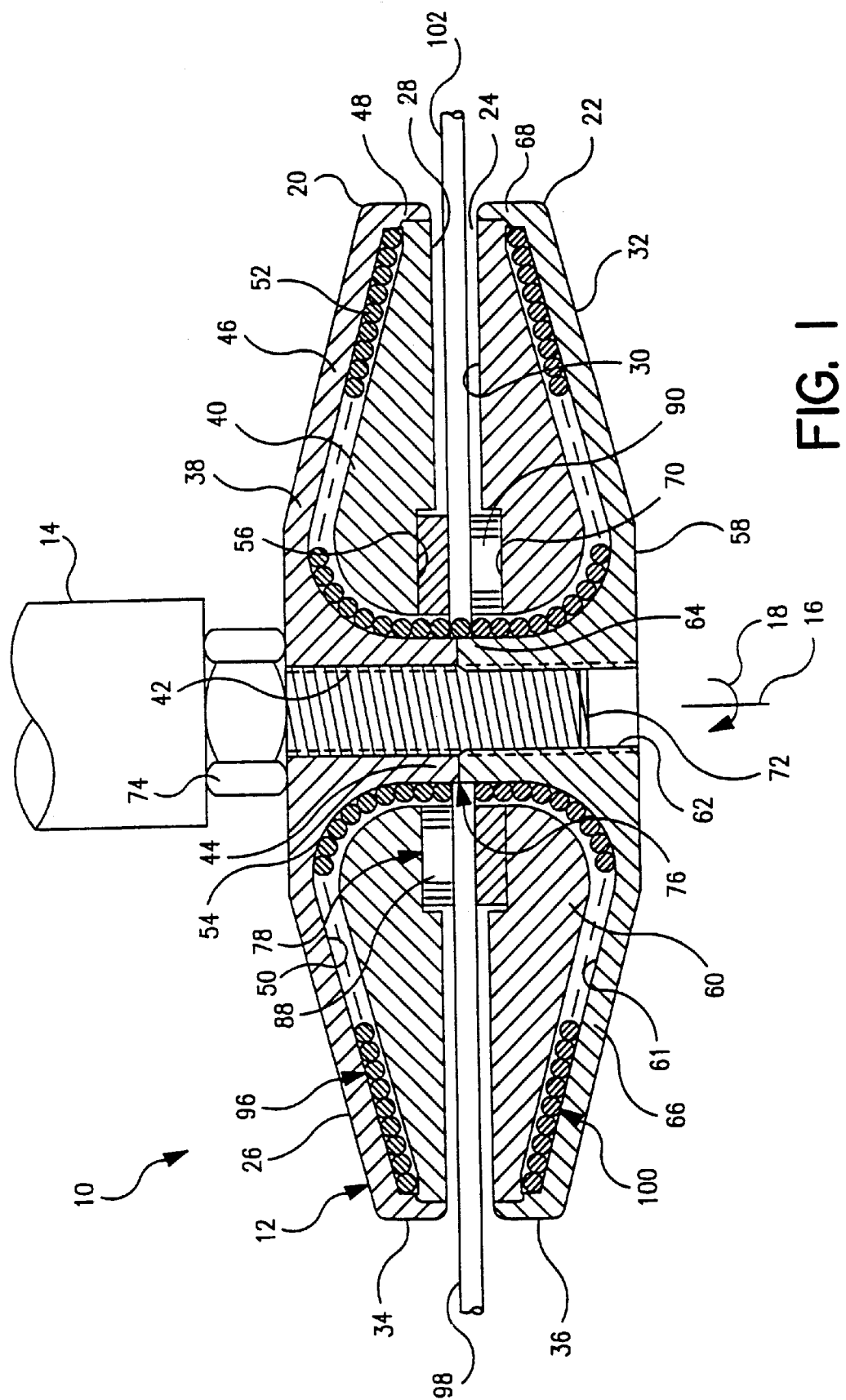
FIG. 1 is a vertical sectional view taken through the head of a first embodiment rotary flail feeding device.

My U.S. Pat. Nos. 5,675,897 and 5,743,019 disclose rotary flail feeding devices related to the present invention. The disclosures of U.S. Pat. Nos. 5,675,897 and 5,743,019 are incorporated herein by reference.

A first embodiment rotary flail feeding device 10 is illustrated in FIGS. 1–4. Device 10 includes a rotary head 12 mounted on rotary drive member 14. Drive member 14 may be rotated by an electric motor or a gas powered internal combustion engine used to rotate head 12 about axis 16 in the direction of arrow 18.

Head 12 is circular in horizontal cross section and generally symmetrical around axis 16. The head includes an upper line housing 20 and a lower line housing 22 separated by central circumferential flail slot 24. The upper housing 20 has a top side 26 and a planar bottom side 28 forming the top of slot 24. The lower housing 22 includes a planar top side 30 forming the bottom of slot 24 and bottom side 32. The top and bottom housings have outer circumferential edges 34, 36 respectively, which overly each other.

The upper line housing 20 includes an upper base 38 and an annular insert 40 mounted in the base. The base includes a threaded central passage 42 aligned with axis 16, an upper post portion 44 surrounding passage 42 and outwardly extending wall 46. Circular lip 48 extends downwardly from the outer end of wall 46 and defines edge 34.

Annular insert 40 is mounted on the inner surface of lip 48. The inner surface of wall 46 is spaced from the inner surface of insert 40 to define an annular line passage 50 extending from lip 48 to post portion 44. The line passage has a frustoconical shape under wall 46 and smoothly bends slightly more than 90 degrees to extend to post portion 44. The passage includes a line storage portion or cavity 52 adjacent lip 48 and a line feed portion 54 extending from portion 52 to post portion 44. A circular recess 56 is provided in the bottom side 28 of insert 40, outwardly of post portion 44.

Lower line housing 22 is similar to housing 20 and is symmetrical with housing 20 across slot 24. Housing 22 includes a lower base 58, like upper base 38, and an annular insert 60, like insert 40. Base 58 includes an axial threaded passage 62 having a diameter slightly less than the diameter of passage 42, and upwardly projecting post portion 64, like post portion 44, a lower wall 66, like wall 46, and an outer cylindrical lip 68, like lip 48. Circular recess 70 is formed in insert 60 below slot 24 and surrounding post portion 64. Recess 70 is like recess 56 in insert 40. The lower base 58 and insert 60 are spaced apart to define a line passage 61 in the lower housing, like passage 50 in the upper housing. Passage 61 includes an outer storage portion or cavity and a line feed portion like portions 52 and 54 of passage 50.

Rotary drive member 14 includes a threaded, two diameter mounting shaft 72 extending below nut 74. The upper, large diameter threaded portion of shaft 72 threadably engages the threads of passage 42 in upper line housing 20 to secure the housing on the drive member. Likewise, the smaller diameter lower portion of shaft 72 engages the threads of passage 62 to secure the lower line housing 22 on the shaft.

The lower line housing is threadably mounted on the lower smaller diameter portion of shaft 72 after the upper housing is mounted on the large diameter portion of the shaft so that the lower and upper ends of post portions 44 and 64 abut each other and form continuous post 76 located at the center of slot 24 and at the inner ends of the two line passages 50 and 61. The housings 18 and 20 are threaded on to shaft 72 in a direction opposite to the direction of rotation 18 of the head to prevent loosening of the housings during operation of device 10.

Figure 4:
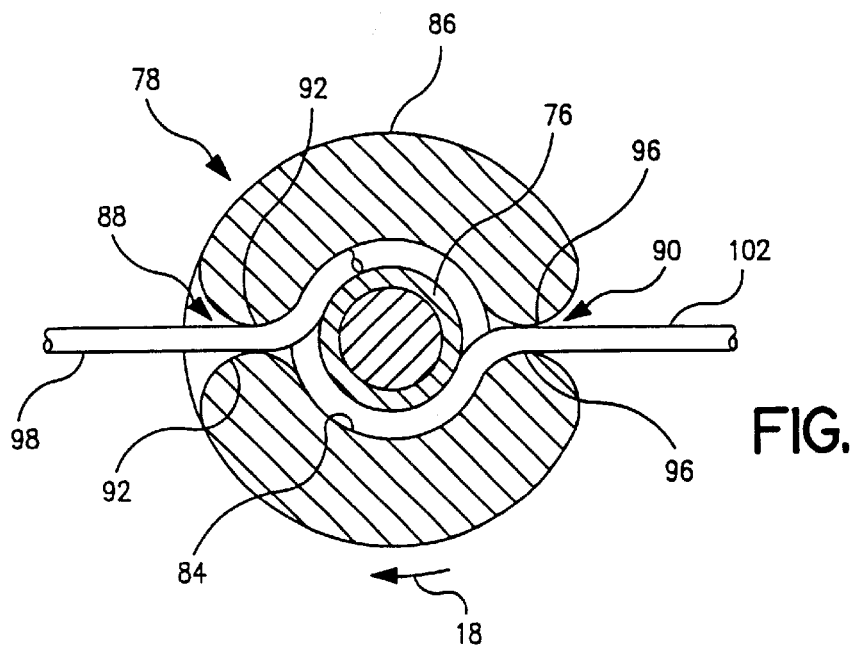
FIG. 4 is a sectional view taken along line 4—4 of FIG. 2.
Figure 3:
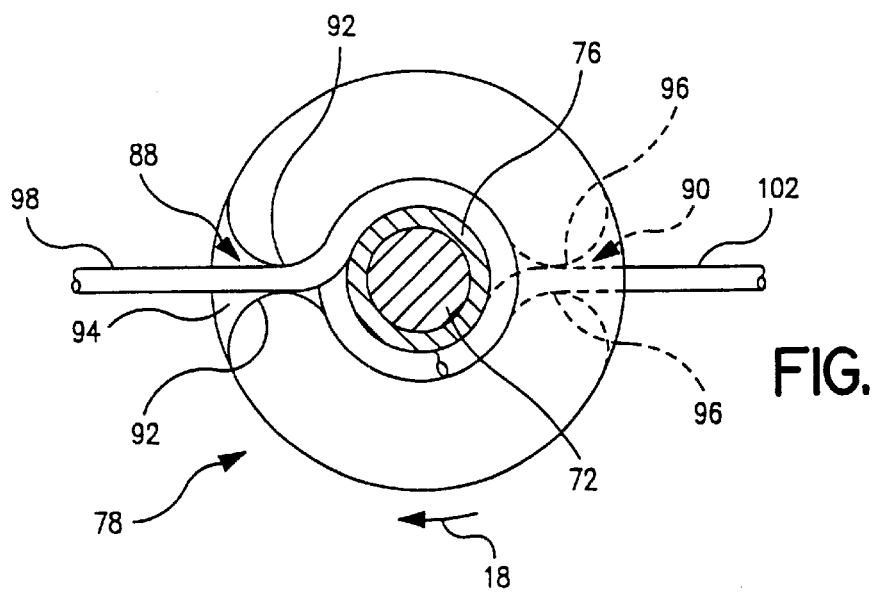
FIG. 3 is a top view of the guide.
Figure 2:
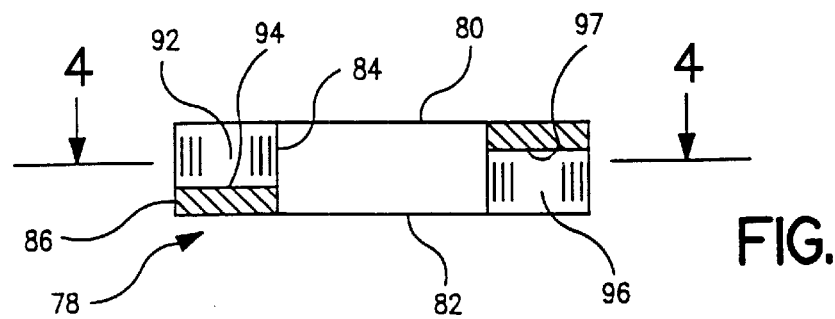
FIG. 2 is a vertical sectional view through the center of a line guide used in the device of FIG. 1.

Generally cylindrical unitary line director or guide 78 is rotatably mounted in recesses 56 and 70 at the center of slot 24. Guide 78 is shown in FIGS. 2–4. Guide 78 has a planar top surface 80, a planar bottom surface 82 and cylindrical inner and outer surfaces 84 and 86. The guide has a sliding fit within recesses 56 and 70 and rotates freely relative to the line housings 20 and 22 with top surface 80 flush with the bottom of recess 56 and bottom surface 82 flush with the bottom of recess 70. The diameter of the guide is slightly less than the diameters of the recesses, as indicated in FIG. 1. Inner cylindrical wall 84 forms extensions of the outer walls of the line passages 50 and 61 and is spaced from post 76.

Upper flail line slot or passage 88 extends downwardly from top surface 80 a distance slightly greater than one-half the thickness of guide 78. Slot 88 is defined by a pair of rounded vertical walls 92 extending from top wall 80 to flat bottom surface 94. Walls 92 have a minimum spacing sufficient to allow free movement of flail line through the slot.

Lower flail line slot or passage 90 is located 180 degrees across the guide from slot 88 and is defined by a pair of vertical rounded walls 96 extending from bottom surface 82 upwardly to flat top surface 97. The minimum spacing between walls 96 permits free movement of flail line through the slot. The vertical distance between surfaces 92 and 97 is approximately equal to the diameter of the flail line fed by head 12 so that the two flails extending out from the head lie in essentially the same plane and trim vegetation evenly. Flail line is easily positioned in the open slots.

Each line housing 18 and 20 of head 12 is loaded with a separate coil of stiffly flexible flail line. Coil 96 of flail line is loaded in and initially fills passage 50 of the upper line housing 20. The coil 96 is wound circumferential around the head from an end located adjacent lip 48 to post portion 44. The inner end of coil 96 extends through the upper flail line slot 88 in guide 78 and out flail slot 24 between the upper and lower housings 18 and 20 to form flail 98. Coil 96 is spiral wound in passage 50 and on post portion 44, from the outer end of the passage to the post, in a direction opposite to the direction of rotation of the head by drive member 14, that is, opposite to the direction of arrow 18.

The lower line housing 22 carries a spiral wound coil 100 of flail line in line passage 61. Coil 100 initially fills the passage from the end adjacent lip 68 to post portion 64 and is also spiral wound in the passage in a direction opposite to the direction of rotation of the head. The line in coil 100 is spiral wound around the post portion 64 of lower line housing 22, led through slot 90 in guide 78 and then extended outwardly of the post 96 to form flail 102.

Line 96 in the upper line housing 18 includes a spiral wound portion surrounding the upper portion 44 of post 76. Line 100 in the lower line housing includes a spiral wound portion surrounding the lower post portion 64. Both of the spiral wound portions of line surrounding the post portions are wound toward the center of the post portions in slot 24 in the same direction, opposite to the direction of rotation of head 12.

The widths of line passages 50 and 61 are less than twice the diameter of the coil line to prevent lengths of coil line from crossing each other and jamming in the passages.

Coils 96 and 100 of flail line are manually fed into passages 50 and 61 when the upper and lower housings are removed from drive member 14. The head is disassembled by first rotating the lower line housing 20 in direction of arrow 18 to unthread the housing from the lower threaded portion of shaft 72. Guide 78 is removed and then the upper line housing 18 is likewise unthreaded from the upper threaded portion of shaft 72.

After removal of the housings from member 14, the lead end of a length of flail line is fed into the line passage 61 in the upper line housing 20 until the end engages lip 48 at the outer end of the passage. Flail line fed into the upper line housing is spiral wound into passage 50 in a counterclockwise direction, when viewing bottom side 28.

The flail line fed into passage 61 of the lower line housing is wound in a direction opposite to the direction of rotation of the head. The line in passage 61 is tightly spiral wound to fill the passage as illustrated in FIG. 1.

With the upper and lower housing passages 50 and 61 filled with coiled flail line with lengths of line extending outwardly of the housings, the head is reassembled by first threading the upper housing onto shaft 72, positioning guide 78 in recess 56 with the length of the flail line from coil 96 in passage 50 fitted in line slot 88. Lower housing 22 is then threaded onto shaft 72 and the length of the flail line from coil 100 is fitted in line slot 90 in guide 78. The lower head is tightened down on shaft 72 so that the outer ends of the post portions 44 and 64 abut each other to form head 12 as shown in FIG. 1. Tightening down of the lower housing on the shaft and upper housing completes reassembly of the head with passages 50 and 61 filled with spiral wound lengths of flail line and lengths of line extending out from the head.

As illustrated in FIG. 1, the flail 98 formed from line in upper housing 20 is fed through upper slot 88 in guide 78. Likewise, the flail 102 formed from line in the lower housing 22 is fed through lower slot 90 in guide 78. If desired, flail line stored in the upper housing 20 may be fed through lower guide slot 90 to form an outwardly extending flail and line stored in the lower housing 22 may be fed through upper slot 88 in the guide to form a second flail.

Device 10 is used by rotating drive member 14 at an appropriate speed in direction of arrow 18. Centrifugal force throws the flails 98 and 100 outwardly from head 12. Centrifugal force holds the flails outwardly from post 76 so that the outer ends may be used to trim vegetative material. Centrifugal force also holds coils of flail line tightly on upper and lower portions 44 and 64 of post 76. The two flails 98 and 102 extend tangentially from the post and are maintained in 180 degree opposition by guide 78.

During initial rotation of head 12, the flail lines unwind from post 76 in the direction of rotation indicated by arrow 18 and are lengthened. Unwinding is caused by centrifugal forces exerted on the rotating lines. During unwinding the two separate spiral coils of flail line on post 76 slide along the post toward the center of the post at guide 78. As line is lengthened the tight wound spiral of line on post portion 44 slides downwardly along the portion toward the guide 78 and the tight wound spiral of line on post portion 64 slides up along the post portion to guide 78. Additional flail line is fed radially inwardly from the spiral wound line in passages 50 and 61 to replenish the line used to lengthen flails 98 and 102. During lengthening of the flails 98 and 102 line guide 78 is rotated in head 12 in the direction of rotation of the head. See FIG. 3.

As the lines lengthen, air drag is exerted on the lines. This drag exerts forces on the lines generally in a direction opposite to the direction of unwinding of the lines. The lines continue to unwind and lengthen until the air drag forces exerted on the lines prevent further unwinding of the lines and maintain the length of the lines, which form contact length flails. At this time, the opposed centrifugal and air drag forces are in equilibrium. The length of the flails at equilibrium is desirably the standard length of the flails in a conventional rotary head and permits vegetation cutting.

When in equilibrium, the centrifugal forces exerted on the flails tighten the flail line in the spiral windings on post 76 and hold the windings tight against the post to assure that the flails rotate with the head. The connections between the windings and the head does not prevent shifting of the windings along the post toward guide 78 during lengthening of the flails.

As head 12 is used to cut vegetation, the ends of the flails are subject to wear and, in time, line material is broken from the ends of the flails. When this occurs the air drag exerted on the shortened flails is reduced. This shortening reduces air drag to a greater extent than shortening reduces centrifugal forces. With the reduction in air drag forces, equilibrium is destroyed and the centrifugal forces unwind additional flail material from the rotating post to increase the length of the flails and reestablish equilibrium.

If only one flail is shortened equilibrium is destroyed and additional flail line is unwound to lengthen both flails until an equilibrium is reestablished. At equilibrium the shortened flail may be slightly shorter than the other flail. In time, both flails wear and will have the same length.

The lengths of flails 98 and 100 are automatically maintained for trimming, eliminating the necessity of operator intervention to maintain the flail lengths.

During feeding of flail line to flails 98 and 100, line in each line housing is fed to guide 78 and one flail independently of feeding of line from the other line housing to the guide and the other flail. The tightly wound coils on post portion 44 are made up of line from coil 96 only. The tightly wound coils on post portion 64 are made up of line from coil 100 only. Line from both housings is not wound together on the post portions so that line crossing and jamming in the line passages is eliminated. The last loops of line in each coil at the center of the post contact each other. The line in these loops is fed to the two flails in the same direction and does not jam.

Head 12 is used as described with automatic feeding of flail line to the flails 98 and 102 until sufficient flail line is exhausted from one coil 96 or 100 to loosen the coil on post 76. When this occurs, the head must be disassembled, the remaining line removed and additional lengths of flail line wound into passages 50 and 61 as described.

Upper and lower bases 38 and 58 and inserts 40 and 60 may be formed from a material of choice, including rigid thermoplastic material and metal. Likewise, guide 78 may be formed from a material of choice, including a rigid thermoplastic material and metal. The flail line in coils 96 and 100 is a commercially available plastic line used in rotary trimmers. The line may be formed from nylon or other plastics, as desired.

FIGS. 5–8 illustrate a second embodiment rotary flail feeding device 110 having a rotary head 112 and a rotary drive member 114. Drive member 114 is identical to rotary drive member 14. Rotary drive member 114 rotates head 112 about axis 116 in the direction of arrow 118.

Head 112 includes upper line housing 120 and lower line housing 122. The upper and lower line housings of head 112 are identical to the upper and lower line housings of head 12 with the exception that the post portion 124 of lower line housing 122 is slightly shorter than the post portion 64 of lower line housing 22 and the post portion 126 of upper line housing 120 is correspondingly longer than the post portion of upper housing 20. Additionally, a circumferential alignment flange 128 extends outwardly from the lower end of post portion 126. Flange 128 is located in the center of flail slot 130, which is identical to slot 24.

Upper line housing 120 includes a flail passage 129 identical to passage 50 and lower line housing 122 includes a flail passage 131 identical to passage 61. Spiral wound lengths of flail line are wound into passage 129 and 131 as previously described and include spiral portions on the post portions 124 and 126. The alignment flange 128 extends outwardly from post 132, made up of portions 124 and 126, a distance slightly greater than the diameter of the flail line in the housings. The flange separates the spiral wound coil of flail line in the lower housing on post portion 124 from the spiral wound coil of flail line in the upper housing on post portion 126.

Figure 8:
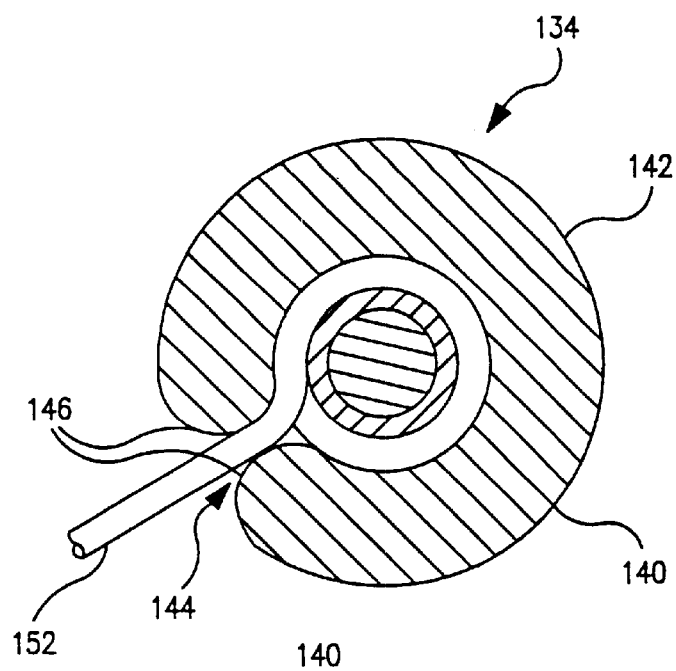
FIG. 8 is a sectional view taken along line 8—8 of FIG. 6.
Figure 7:
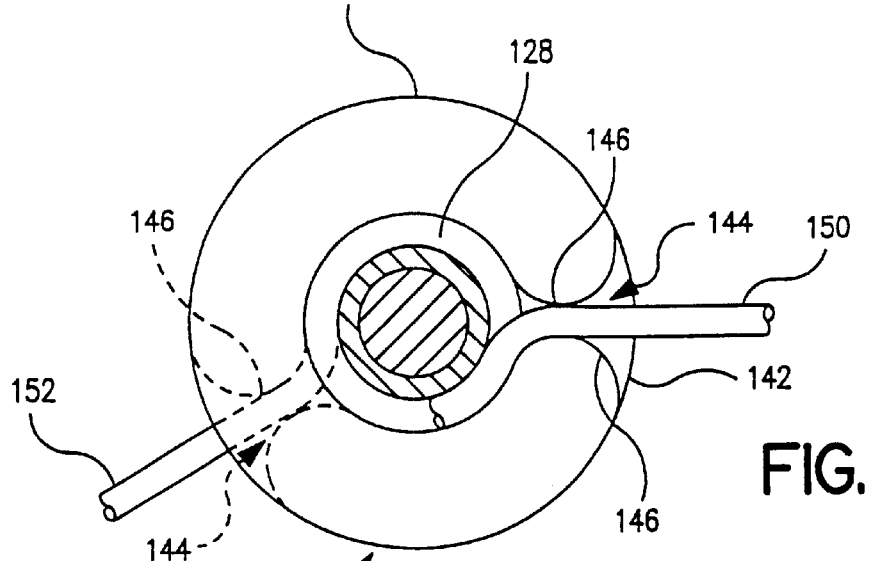
FIG. 7 is a top view of FIG. 6.
Figure 6:
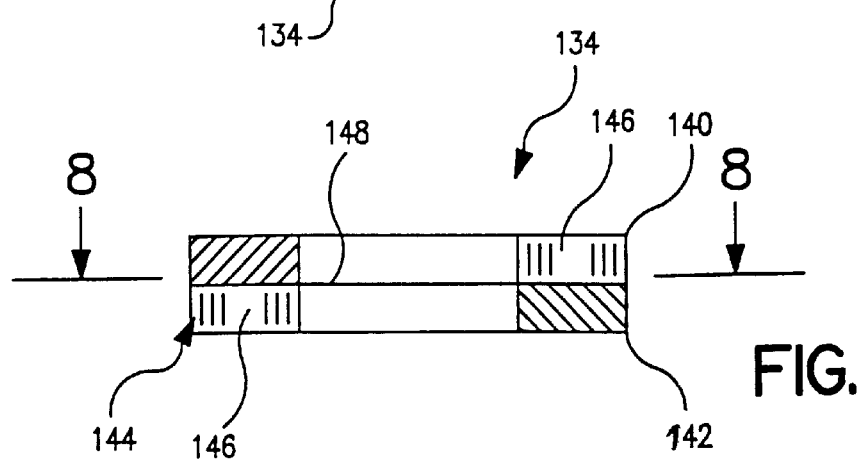
FIG. 6 is a vertical sectional view through a two ring line guide used in the second embodiment.

Two part line director or guide 134 is positioned between the upper and lower housings 120 and 122 in recesses 136 and 138, corresponding to recesses 56 and 70 in head 12. Guide 134 is shown in FIGS. 6 through 8. The guide has an exterior shape like that of guide 78 and like upper and lower rings 140 and 142. Each ring has a height equal to one-half the height of the guide. Each ring is cylindrical with a flat top and bottom surface and cylindrical inner and outer walls with the exception of a line slot or passage 144 extending through the ring from the inner cylinder wall to the outer cylinder wall of the ring. Vertical curved walls 146 are located on opposite sides of the slots 144. As in guide 78, the width of each slot 144 is slightly greater than the diameter of the flail line dispensed by head 112. Ring 140 is stacked on top of ring 142. The rings are free to rotate relative to each other at interface 148.

In head 112, flail line from the coil in the upper housing 120 is guided from the coil of line on post 132 above flange 128 through slot 144 in the upper ring 140 and out flail slot 130 to form flail 150. Correspondingly, flail line from the coil wound from flail line in lower housing 112 extends outwardly from post 132 through slot 144 in the lower ring 142 and into flail slot 130 to form flail 152. Flails 150 and 152 extend outwardly of slot 130 in essentially the same plane for even cutting.

After flail line is wound into the upper and lower housings 120 and 122 the housings are mounted on shaft 72 of rotary drive member 114 with guide 134 in place and flail 150 extending through flail line slot 144 in the upper ring 140 and flail 152 extending through slot 144 in the lower ring 142. Flange 128 on post 132 physically separates the spiral windings of flail line on the upper and lower portions of the post and prevents movement of each winding beyond the center of the post during feeding of flail line to flails 150 and 152.

Head 112 is rotated by drive member 114 in the direction of arrow 118. Independent equilibriums are established for flails 150, 152. During feeding of flail line to lengthen a flail, the upper or lower ring through which the line extends is rotated in the housing in the direction of rotation of the housing, independent of the position of the other ring. Thus, in head 112, the lengths of the flails 150 and 152 are established independently of each other. During lengthening of one flail, the wound spiral of line which is fed to the flail is moved downwardly along the appropriate portion of post 132 to the flange and one ring 140, 142. Flange 128 assures that this movement does not move the spiral of flail line which is not being fed.

Because each flail is elongated independently of the other flail and the rings of guide 134 are rotatable relative to each other, the guide does not maintain the two flails 150 and 152 in 180 degree orientation. Rather, the angular orientation of the flails around post 132 is determined by feeding of line to the individual flails. For instance, if one flail is foreshortened and the other flail is not foreshortened, equilibrium for the first flail is destroyed and additional flail line is fed to the flail to lengthen the flail until equilibrium is reestablished. During this time, the other flail which is not foreshortened, is not lengthened. During lengthening of the first flail, the ring 140, 142 through which the flail extends would be rotated in the head in the direction of arrow 118 and the ring for the other flail would not be rotated. FIG. 7 illustrates an arbitratory position where the two flails are in a non-180 degree position.

Flange 128 also keeps flails 150, 152 in the flail slots when the flails are both located in the same circumferential position and the slots are located over each other.

Head 112 maintains the lengths of a pair of flails 150, 152 for efficient vegetative cutting. The lengths of the flails are maintained automatically, without operator intervention, until the flail line is exhausted.

Figure 5:
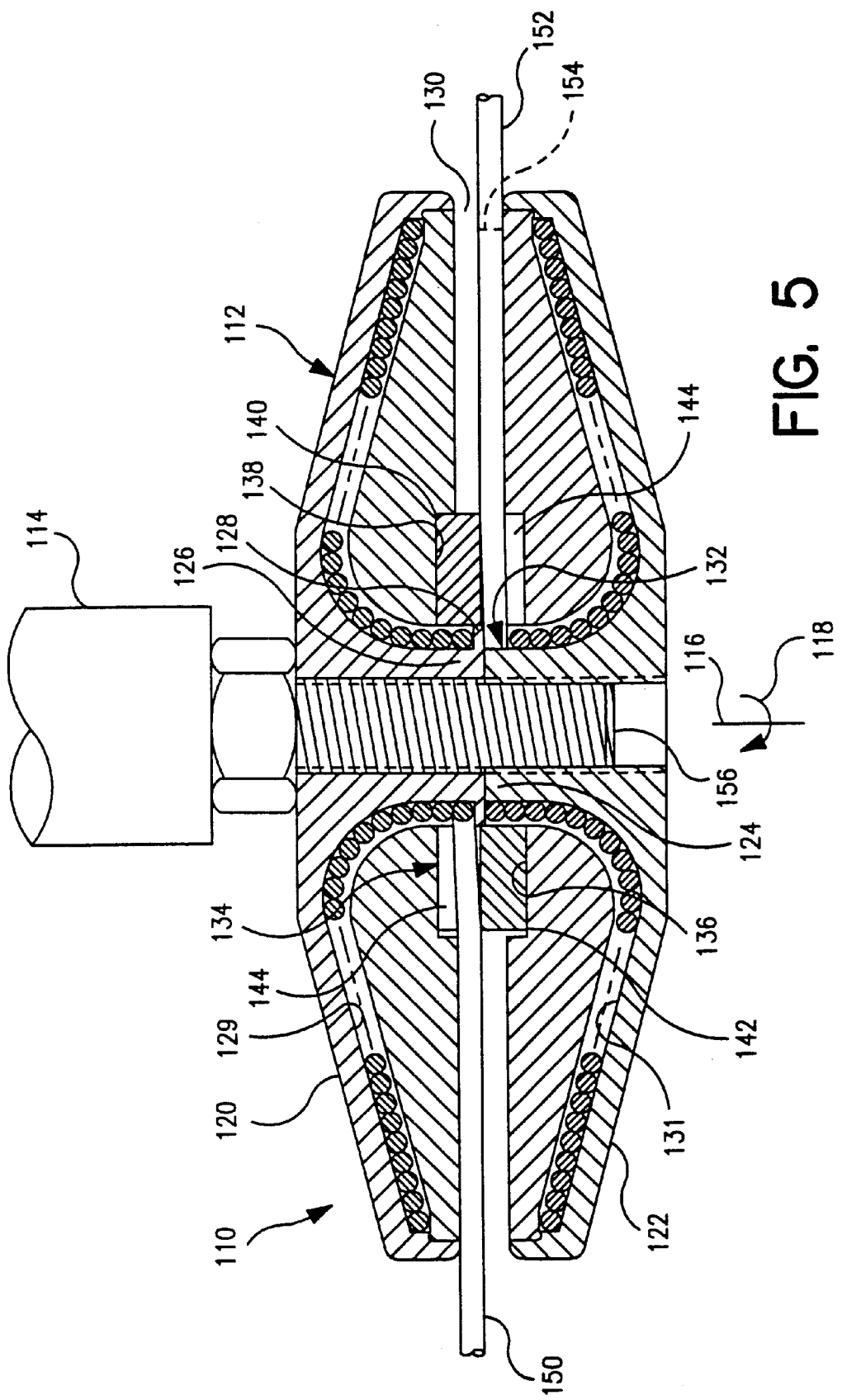
FIG. 5 is a vertical sectional view through the head of a second embodiment rotary flail feeding device.

Head 112 may be used with a single flail if desired. For single flail operation, both upper and lower housings 120, 122 are loaded with flail line, as described, with the exception that the end of the flail line extending outwardly from the lower housing 122 does not extend outwardly from flail slot 130. In this case, the flail line in the slot has a free end indicated by dashed line 154, located a short distance inwardly from the mouth of slot 130, as illustrated in FIG. 5. The flail line extending outwardly from the upper housing 120 extends outwardly from the flail slot 130 a distance sufficient to form a cutting flail in an equilibrium position when drive member 114 is rotated in the direction of arrow 118. Rotation of the head does not extend flail line from the lower housing 112. The short length of flail line in slot 130 is maintained in the position indicated in FIG. 5 during cutting using the flail line in the upper housing 112.

Cutting continues using a single flail, with automatic relengthening and replenishment of the flail from the flail line in passage 126, as previously described, until the flail line in the upper housing is exhausted. When this occurs the operator deactivates the drive rotating member 114, unthreads the lower housing from rotary drive member shaft 156 and pulls the end of the flail line on the top side of the lower housing outwardly a distance sufficient to establish a flail at equilibrium length. Trimming can then be recommenced after reattachment of housing 122 on shaft 156 using the flail fed from line in the lower housing. Use of head 112 with a single flail increases the cutting time before it is necessary to disassemble the head completely and reload flail line into both the upper and lower housings. When trimming light vegetation, single flail operation may be desirable and more economical than two flail operation. Single flail operation of head 112 is facilitated by two part guide 134, which permits feeding of line to one flail only.

Both heads 12 and 112 include flail line passages having a width less than twice the diameter of the flail line. These passages extend to the winding posts and feed spiral wound coils of flail line to the posts. The storage capacity of the passages is limited by the diameter of the heads. If desired, the outer radial portions of the flail line passages may be widened to store long lengths of flail line in large coils having a width larger than the diameter of the line. These coils are longer than the lengths of flail line wound in the disclosed single thickness passages. Increased capacity line passages or cavities are disclosed in my U.S. Pat. Nos. 5,675,897 and 5,743,019.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention:

1. A rotational cutting device for feeding two flails, the device comprising a rotary head having two line housings; a circumferential flail slot between the housings; a winding post at the center of the head joining the housings and extending across the flail slot; each housing including an annular line storage cavity located outwardly from the post and an annular line feed passage extending from the line storage cavity to the post; the post including a first portion extending outwardly from the line feed passage in one housing and into the slot and a second portion extending outwardly from the line feed passage in the other housing and into the slot; wherein a length of flail line may be spiral wound into the line cavity and line passage in each housing with a coil of such line surrounding the post portion adjacent such housing and an end of such line extending into the flail slot.

2. The device as in claim 1 including a line guide surrounding the post in the flail slot, the line guide including two radial line passages.

3. The device as in claim 2 wherein the radial line passages comprise line slots and are circumferentially spaced apart 180 degrees on the guide, and the guide is unitary.

4. The device as in claim 3 wherein one line slot is open adjacent one line housing and the other line slot is open adjacent the other line housing.

5. The device as in claim 2 wherein the line guide comprises two stacked rings, said rings rotatable relative to each other at an interface, and each radial line passage comprises a line slot.

6. The device as in claim 5 wherein the winding post includes a flail alignment member located in the flail slot.

7. The device as in claim 6 wherein the alignment member comprises a flange extending around the post.

8. The device as in claim 1 including a flail alignment member on the post in the flail slot.

9. The device as in claim 8 including a cylindrical line guide surrounding the post outwardly from the alignment member, and two radial line slots in the line guide.

10. The device as in claim 1 wherein each line feed passage has a width less than twice the diameter of the flail line.

11. A rotary device for automatically feeding two flails, the device comprising a head rotatable about an axis, the head comprising two line housings, each housing including an annular line storage cavity located outwardly of the axis, an annular line passage extending inwardly from the line storage cavity toward the axis, and a post portion located on the axis and extending from the inner end of the annular line passage a distance along the axis outwardly from the line passage; wherein a length of flail line may be spiral wound in the line cavity and line passage of each housing with a coil of line surrounding the post portion of the housing and an end of the line located outside each housing extending away from the post portion.

12. The device as in claim 11 including a flail alignment member.

13. The device as in claim 11 including a line guide surrounding one of said post portions, said line guide including at least one radial line passage.

14. The device as in claim 13 wherein said housings are spaced apart to either side of a circumferential flail slot and said post portions comprising parts of a cylindrical post located on said axis and extending between said housings, the inner ends of said annular passages opening into the flail slot at the post.

15. The device as in claim 14 including a line guide surrounding said post, said line guide including two radial passages.

16. The device as in claim 15 wherein the radial passages are circumferentially spaced apart 180 degrees on the guide and the guide is unitary.

17. The device as in claim 16 wherein said radial passages comprise slots, each slot opening facing one housing.

18. The device as in claim 15 wherein the line guide comprises two stacked rings, said rings rotatable relative to each other at an interface, and each ring includes a radial passage.

19. The device as in claim 18 wherein said radial passages comprise slots.

20. The device as in claim 14 including a flail alignment member on the post in the flail slot.

21. The device as in claim 20 wherein said alignment member comprises a circumferential ring extending outwardly from the post between said post portions.

* * * * *